Dec. 23, 1941.   S. H. BERCH   2,267,320
METHOD AND MEANS OF PACKING MATERIALS
Filed Dec. 2, 1938   2 Sheets-Sheet 1

INVENTOR
SAMUEL H. BERCH
BY James M. Abbett
ATTORNEYS

Dec. 23, 1941.    S. H. BERCH    2,267,320
METHOD AND MEANS OF PACKING MATERIALS
Filed Dec. 2, 1938    2 Sheets-Sheet 2
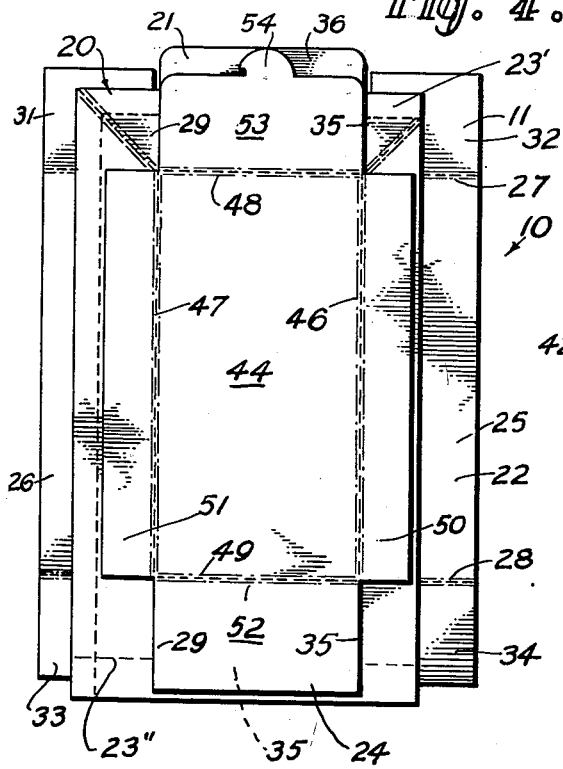
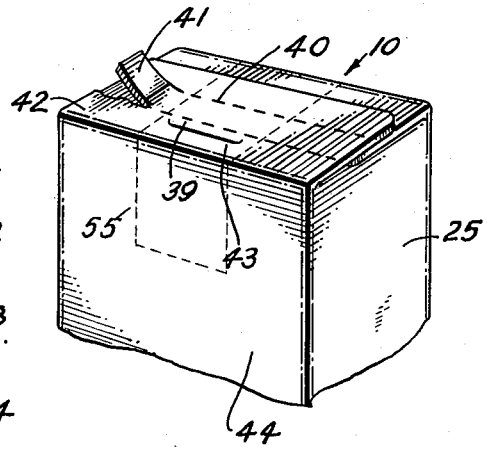
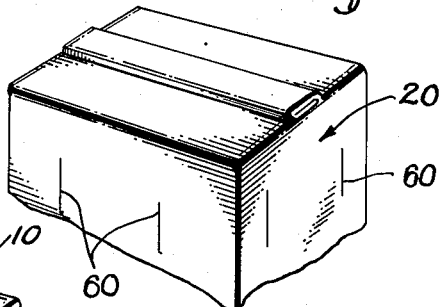
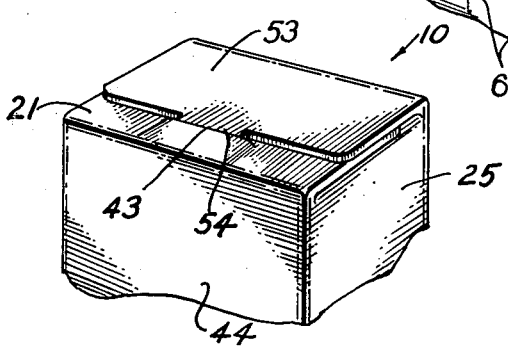
INVENTOR
SAMUEL H. BERCH
BY
ATTORNEYS Patented Dec. 23, 1941

2,267,320

UNITED STATES PATENT OFFICE 2,267,320

METHOD AND MEANS OF PACKING MATERIALS

Samuel H. Berch, Los Angeles, Calif.

Application December 2, 1938, Serial No. 243,626

1 Claim. (Cl. 93—6)

This invention relates to the packaging of foods and the like and particularly pertains to a method and means of packing materials.

At the present time it is common practice to pack materials which are of a perishable nature or which will deteriorate under oxidization within tin or glass containers. This is particularly true when it is desired to hermetically seal the contents within the container or to seal it under conditions of vacuum, especially if the materials are oily or greasy, such as mayonnaise, salad dressing and cheese. In the case of mayonnaise, if the carton were not absolutely grease-proof its rigidity would soon be lost. Mayonnaise has been put in carton containers heretofore but it has not kept for any length of time because the containers become soft. Cheese is rich in butterfat and the grease penetrates the container. When the air comes in contact with cheese it begins to mold, takes on an unappetizing appearance, becomes dry, and the quality is soon spoiled. For this reason tin foil has been used to quite an extent in cheese wrapping, particularly to keep the grease away from the carton. Tin foil is porous. Not being air-tight, it cannot be made vacuum-tight. Cheese manufacturers, therefore, date cheese to keep the packages from remaining too long on the grocers' shelves. There is much waste in cheese on account of the "come backs" because of spoilage. Previous attempts to perfect a grease-proof non-metallic carton have been failures to a great extent. The same applies to cocoa and other edible powders, also to dried fruits, such as prunes, etc. All kinds of canned fruits and vegetables, also biscuits and cookies, packed under vacuum may be packed under this new process. Loose tobacco, cigars, etc. lose aroma and flavor, or dry up as now packed because the air deteriorates these products. Drugs such as bromo-seltzer, citro-carbonate, etc. usually packaged in tightly sealed bottles to prevent their drying out and caking eventually are impaired in quality and strength.

Containers of the above-mentioned type are expensive and the disposal of the empty containers provides a problem. It is desirable therefore to provide a carton having a fibrous base, such as cardboard or the like, and within which materials may be vacuum-sealed and retained for an indefinite time in an unspoiled condition without deterioration of the container, even though the material packed is a liquid or a product having an oily or greasy base.

It is the principal object of the present invention to provide a revolutionary and novel method and means of packaging liquids which may contain oils or grease, semi-solids or granular and powdered materials, whereby they may be sealed hermetically within a rigid container of inexpensive construction and protected against deteriorating action which might be produced by the generation of gases emanating from the contents of the container or by contamination or oxidization from fluids which might seep into the container, the invention further contemplating that the contents of the container may be vacuum-sealed if desired, and that all of these results and advantages may be brought about by the use of a container having a rigid wall impervious to gases, moisture or greases, and made from materials inexpensive as to cost and manufacturing operations, such for example as paper, cardboard and the like, and which containers will not deteriorate due to the action of any produce packed within them and which after use may be readily discarded.

It is also an object of the invention to provide a container which may be readily maintained in a non-collapsed position when empty and readily formed to receive a product.

The present invention contemplates the provision of a rigid or semi-rigid container, the walls of which are made from cardboard or the like and which container embodies the use of a material having the characteristic of being impervious to the action of gases, moisture, oils or grease, or the walls of which container may be impregnated with said material whereby the mass of the container wall will have the characteristic of being impervious to gas and moisture, and the deteriorating action of oils, and may be sealed in a manner to preserve the product vacuum-tight.

The invention is illustrated by way of example in the accompanying drawings, in which:

Fig. 4 is a view in plan showing another form of carton embodying the principles of the present invention.

Fig. 6 is a fragmentary view in perspective showing the sealed carton.

Fig. 7 is a view in perspective showing the carton after opening and re-sealing.

Fig. 8 is a fragmentary view showing a modified form of the invention.

Figure 1:
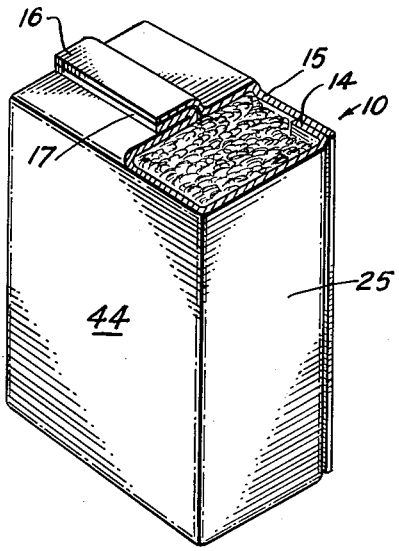
Figure 1 is a view in perspective showing a form of container of which the present invention is concerned.

Referring more particularly to the drawings, 10 indicates a carton. This carton preferably has a cardboard base. It is understood, however, that it may be made of various types of fibrous material and that in fact it might be desirable to make it from some suitable grade of fabric. In the form of the invention generally indicated in Fig. 1 the carton is shown as being rectangular, and thus having square corners. It is to be understood that various other shapes of carton may be used ranging from a container having flat sides to one being circular in section. In any event, the container wall includes a material having a rubber base which is either impregnated within the mass of the wall itself or is intimately associated therewith in the form of a thin film of suitable thickness applied either exteriorly of the rigid container or interiorly thereof. It is desirable that this lamina shall comprise a rubber composition base, such for example as that known to the trade as "pliofilm," for it has been found that this particular material has pliability, does not readily deteriorate, is impervious to moisture and gas, and makes it possible to heat seal the seams, making the container vacuum-tight.

The present invention has particular merit in that it is made of flexible material, it can be vacuumized and the seams heat sealed, so that the entire wall structure will collapse against the product due to its flexible character but will not expand since it is non-stretchable. This insures that the product will be so tightly packed as to eliminate the danger of breakage of the rigid walls of the container under conditions of atmospheric pressure.

The rubber compositions of the type previously mentioned have a characteristic not found in any other kindred material in that their meeting surfaces may be heat sealed together to produce a homogeneous seam, which is pliable without rupturing and which makes it possible to provide an air-tight container, the seams of which are heat sealed and will remain permanently vacuum-sealed without the use of adhesives which would produce a non-flexing rigid seam which would easily open if not subject to very careful handling.

Figure 2:
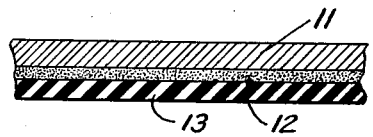
Fig. 2 is a view showing an enlarged fragmentary section of the form of the invention in which the wall is laminated.
Figure 3:
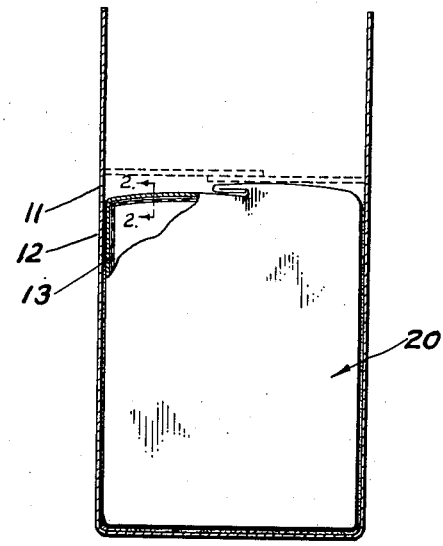
Fig. 3 is a view in vertical section showing another form of the invention in which the wall is laminated with the rigid carton disposed exteriorly of the lamination to protect the interior sealed envelope and to prevent the structure from becoming ruptured at the corners of the package in the event that the package is made of square or rectangular section.

By reference to Fig. 2, the cardboard backing is indicated at 11, over one surface of which is applied a coating of an adhesive material 12. This material may be any one of various well-known non-setting adhesives which retain their pliability indefinitely. It may be found desirable to use a setting glue. The adhesive is interposed between the rigid wall 11 of the carton and the film 13 characterized as being of rubber composition. As previously stated, it may be found desirable to impregnate the sheet of material 11 with rubber composition, in which event the glue coating will not be required and in which event sufficient rubber will be present in the mass of the container wall to make it possible for the seams of the material to be vulcanized together, such for example as the wall flap 14 shown in Fig. 1 and the wall panel 15, and the end flaps 16 and 17. It has been found, however, that under some conditions, such for example as when the cartons are subjected to rough handling that the edges or corners of cartons are vulnerable points of weakness, and at which points the carton might be ruptured so that the hermetical seal or the condition of vacuum within the carton will be impaired. For that reason it is desirable to construct the container with a laminated wall, as shown in Fig. 2, and preferably to arrange the laminae so that the lamina 13 will be innermost and will be protected by the outer wall section 11, as shown in Fig. 3 of the drawings.

Referring more particularly to Figs. 4 to 7 of the drawings, a form of the invention is shown which embodies the features previously described and disclosed but which provides additional desirable features of novelty. In this particular form of the invention a collapsible carton is shown including an inner laminated bag or container constructed of a layer of pliofilm or the like laminated to a sheet of non-stretchable paper, the seams of which are heat sealed to insure the vacuum-tight sealing of products within the bag. Permanently associated with the inner container or bag is a rigid outer container formed of two cardboard pieces adapted to produce a carton. The bag is generally indicated at 20 in the drawings and the carton pieces are indicated at 21 and 22. The bag is preferably made of a continuous sheet of laminated material constructed in accordance with the principles of the invention previously described and indicated generally in Fig. 2 of the drawings. This sheet of material is folded upon itself so that the inner layer of rubber composition 13 will abut against itself along the marginal edges of the sheet 13 and may be heat sealed together to form a seam lap 23, corresponding generally to the construction indicated at 16 and 17 of Fig. 1 of the drawings. This lap in the present instance extends along one edge as indicated at 23' and along the side as indicated at 23. The remaining end of the folded sheet is left open until after it is filled and it is then heat sealed, as indicated at 23''. The sheet formed with the heat sealed seams 23 and 23' is laid flat and the cardboard sections 20 and 21 are applied to it and are secured thereto by suitable adhesive, preferably a glue of non-setting character. It will be noted that the carton section 22 is rectangular in shape, having a central rectangular panel 24 and opposite side panels 25 and 26. The width of the side panels indicates the thickness of the carton and the width of the back panel 24 indicates the width of the carton. These panels are separated from each other by parallel longitudinal score marks and end lengths of all three panels are separated by transverse score marks 27 and 28. The panels are separated from each other for a distance from their ends to the score marks 27 and 28 along lines of severance 29 and 30. In this manner corner flaps 31, 32, 33 and 34 are formed and end flaps 35 and 36 are formed as continuations of the central panel 24. The end flap 36, for purposes to be hereinafter described, is formed as shown in Fig. 6. Here it will be seen that it is provided with two transverse lines of perforation 38 and 39, thus dividing this flap into an end field 40, an intermediate field 41 and a field 42. A transverse sealing serration 43 is cut in the field 40. The corner fields 33 and 34 and the end field 37 may be prepared with suitable mechanical fastenings, although they are here shown as designed to be sealed by an externally applied tape or sealing member.

Figure 5:
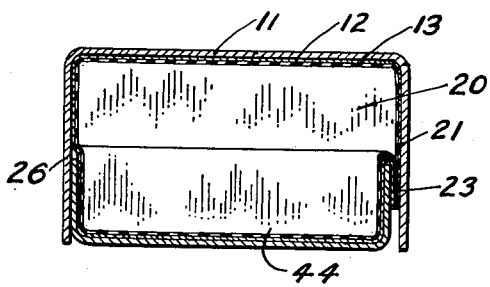
Fig. 5 is a view in end elevation showing the formed position of the side walls of the device shown in Fig. 6.

Applied to the opposite side of the bag or vacuum-sealed container 20 is the carton section 21. This section has a central rectangular field 44 which represents the final dimension of the height and width of the carton, it being understood that the fields 25 and 26 represent the thickness of the carton. The field 44 is defined by side score marks 46 and 47 and end score marks 48 and 49. It is to be understood that a similar field is provided by the carton section 22. At opposite sides of the field 44 are side flaps 50 and 51 which are substantially one-half the width of the flaps 25 and 26 and fold within these flaps, as shown in Fig. 5 of the drawings, when the structure is assembled. The terminating edge of the field 50 is along the fold of the sheet used in forming the inner container 20 and the terminating edge of the flap 51 is along the innermost line of the heat sealed seam 23. At the opposite ends of the field 44 are end flaps 52 and 53. The end flap 52 is substantially rectangular and is of a shorter length than the corresponding end flap 37 of the carton section 22. The end flap 53 is substantially rectangular and has projecting from its outer marginal edge and intermediate its length a locking tang 54. This tang cooperates with a locking slit 43 of the end flap 36, as will be hereinafter described.

The carton section 21 is applied to the face of the inner container 20, preferably by the use of a non-setting adhesive. The carton is then ready for filling. It will be evident that the containers may be laid flat in storage and will occupy a very small amount of storage space prior to use. It will also be seen that the weight of this container is very small and that this will result in a material saving to the manufacturer and the consumer.

When it is desired to use the carton the sides are pressed in so that the flaps 50 and 51 will fold inside of the flaps 25 and 26, as shown in Fig. 5 of the drawings, thereby forming a carton of rectangular section and rectangular design. It will also be understood that while a container of one shape is here shown that the invention lends itself to the construction of containers of any other desired shape. After the package has been thus shaped the portion of the inner container which projects beyond the score marks 27 and 49 is folded in so that the corner flaps 31 and 32 may be thereafter folded over it. The end flap 53 is then folded down and the end flap 36 folded over it. This end structure, as shown in Fig. 6, is then held in its folded position by sealing tape indicated at 55 in Fig. 6.

During the filling operation the end portion previously described will be the bottom of the container. The container is then filled and the seam 23 is heat sealed while the inner container is subjected to vacuum. This final heat sealed seam is indicated at 23″. The corner flaps 33 and 34 are then folded over, after which the end flaps 52 and 37 are folded over each other and finally secured together by a tape similar to that indicated at 55.

When it is desired to open the container the panel 41, defined by perforation lines 38 and 39, may be grasped at one end and pulled upwardly, as indicated in Fig. 6 of the drawings, so that it will tear out and tear across the sealing flap 55. This will facilitate in opening the container and permits the seal to be broken while yet leaving the flap portion 42 with its locking slit 43. When desired the container may be again closed and the flaps 53 and 36 held in their closed position by inter-engagement of the locking tang 54 with the slit 43, as shown in Fig. 7 of the drawings. This insures that extraneous matter will not get into the container after it has been opened and will provide other desirable features which are self-evident.

It is to be understood that the entire outer side wall structure of the finished carton is to be covered with a label which will be sealed over the surface of the structure to maintain all of the seams of the outer carton in a dust-proof condition. It will be evident that in the manufacture of the new carton it can be made automatically by machinery with the exterior of the surface of the carton folded within the structure so that there will be no occasion for dirt to reach it or for human hands to touch it prior to the time a particular product is to be placed in it. The carton may then be opened automatically and filled and sealed in automatic machinery. This will provide a cheap and inexpensive carton which will have all of the advantages of a rigid metallic, glass or earthenware container, and will at the same time insure that a product will be vacuum-sealed therein. Another advantage of the present structure is that the relatively flexible inner container 20 when opened at a point to permit liquids to be poured from it will provide a pouring spout. This will prevent the liquid from coming in contact with the outer walls of the container and prevent contamination of the product, which is not possible when products are placed in cans and are poured therefrom through a hole punctured in the wall thereof. Under such circumstances the liquid will contact the outer unclean and unsanitary surfaces of the container and may be objectionably contaminated. This will not occur in the use of the present container. A particular advantage of this feature of the invention is that since certain products, as for example milk, readily deteriorates after contamination and when dispensed in the container here shown the possibility of deterioration will be minimized.

It is to be understood that containers of this particular construction and type may be used for any kind of material, such for example as various liquids, including milk and oils, semi-solids such as mayonnaise, butter and cheese, granular materials such as drugs, chemicals, coffee and spices, and finely divided materials such as flour and powdered products. Cigars and tobacco products may be also desirably sealed.

In utilizing the present invention the container may be made in either of the two forms previously described, that is the form of the invention in which the relatively stiff walls of the container are impregnated with a rubber compound which will render the walls grease-proof and impervious to air and moisture, or the other form of the invention in which the wall of the container is laminated and comprises a lamina of relatively stiff material such as cardboard, a lamina of a rubber compound such as a thin sheet of pliofilm and an intermediate lamina of an adhesive such for example as some common type of plastic non-setting glue. After the container has been thus formed it may be filled with the product to be packed and then subjected to a vacuum action, such for example as might be obtained by the structure shown in my co-pending application entitled "Method and means of packing food products and the like," Serial No. 210,038, filed by me on May 25, 1938, after which the seams of the opened end or side of the container may be closed by heat sealing so that a completely sealed package, the walls of which are impervious to air and moisture, will be produced, and which walls are sufficiently rigid to establish and maintain a definite predetermined shape for the package.

In considering the new package made in accordance with the present invention, pliofilm is laminated to paper and then the paper is laminated to cardboard, resulting in a rigid non-collapsible container, grease-proof and air-tight. It has been discovered that the $CO_2$ or other gases in the product are absorbed by the rubber base. Oxygen cannot enter the package so when coffee is packed in this rigid container, for instance, the collapsing may be eliminated because the gas that emanates from the cells of the coffee is absorbed by the rubber base, the carton remaining rigid and air-proof under vacuum. In making this type of carton it is unnecessary to allow space for the gases. The carton will not explode and such packing has a different effect entirely on coffee than when it is packed in a glass jar or tin can, neither of which absorb gases.

While in my previous application I dealt with a collapsible bag which retains the gas in the coffee, now I am working on a rigid container and through the use of different laminations and different applications of glues, I have produced a pliofilm cardboard container which will absorb the natural gases of the products so packed, keeping them fresh and wholesome. Vacuum may be retained in this new type package the same as in glass or tin. Coffee so packed remains fresh because the $CO_2$ which is so important to coffee is kept within the container, preserving the coffee in an excellent condition and preventing the access of any air to the package. This package may be used for all food products such as coffee, dried fruits, biscuits, cookies, tobacco, etc.

Attention is directed particularly to the fact that in the form of the device shown in Figs. 4 to 7 a package may be formed having a rigid outer wall of permanent form and shape and within which a collapsible inner container is provided. Under ordinary circumstances if a collapsible inner container is placed within a rigid outer carton and sealed thereto any vacuum action to which the inner container is subjected would tend to collapse the container and draw it away from the walls of the rigid outer container. Due, however, in the present case to the fact that the side walls of the two carton sections 21 and 22 are not fastened together or interlocked but that their flat portions overlap, it is possible for the outer container to adjust itself to the contracted size of the inner container without in any wise placing a strain on the inner container or causing it to pull away from the relatively rigid walls of the outer container.

It is to be understood that while the carton, as shown in Figs. 4 to 7 inclusive, is made with an outer carton wall formed in two pieces that it is within the scope of the present invention and was the intent of the inventor to form the outer carton in a single piece if desired. Under such circumstances it will be understood that the outer carton walls 21 and 22 would be integral along one of their marginal edges and that the free ends would overlap along the opposite marginal edge. This would allow collapse of the carton without causing separation of the inner flexible carton from the rigid outer wall, as previously described.

It will also be seen by reference to Fig. 8 of the drawings that the same expansion and contraction can be obtained in the flexible inner container as is obtained by the overlapping edges of the rigid outer container for the non-stretching outer sheet of material is formed with one or more slits, as indicated at 60.

It will thus be seen that the invention here disclosed provides a package which may have a definite design and which may be maintained in a definite rigid configuration, the package being characterized as having heat sealed seams which insures the complete hermetical sealing of the package and the possibility for materials to be sealed under vacuum, the walls of the package being relatively stiff and being impervious to gas and moisture and grease or oil, so that the walls will not deteriorate and will maintain their vacuum-sealed condition. The structure also insures that the contents of the container cannot act to produce deterioration or disintegration of the container walls while even a greasy liquid product is placed within the container, and will insure that after the container has been emptied it will not produce any problem as to its disposal since it may be readily discarded or burned. It will also be evident that such a structure is of relatively light weight and that packages of rectangular shape may be conveniently packed in cartons for shipping since they can be placed together in a relatively small space without any waste space as would occur if the individual containers were of circular cross-section, as is usually necessary in order to properly seal containers made of tin or glass.

While I have shown the preferred form of my invention as now known to me, it will be understood that various changes may be made in combination, construction and arrangement of parts by those skilled in the art, without departing from the spirit of my invention as claimed.

Having thus described my invention, what I claim and desire to secure by Letters Patent is:

A method of packaging products, which consists in the use of a container formed of flexible laminated sheet material, the inner lamina being of a rubber composition which renders the sheet of material impervious to oil, moisture and grease, the sheet of material forming a bag-like receptacle having opposite closed sides and one closed end, the opposite end being of a length to project beyond the end of a package to be formed thereby, the said bag-like structure having relatively stiff wall panels secured to the outer surfaces of two opposite sides thereof and scored to overlap upon the remaining sides, said panels carrying end flaps adapted to fold and form the ends of a container, thereafter shaping the container thus formed to hold it in an open condition for filling, then filling the receptacle, then vacuumizing the receptacle and its contents, whereby the flexible walls of the container will collapse against the product therein and the wall panels will conform thereto to provide a stiff outer wall structure, then drawing the projecting end portion of the mouth of the receptacle together, whereby the receptacle will be closed with its inner rubber surfaces abutting, then applying heat and pressure to said portion to heat seal the same and retain the vacuum within the receptacle, then folding the previously open end of the package to close the same.

SAMUEL H. BERCH.